W. G. ANDERSON.
GARDEN HOE AND WEEDER.
APPLICATION FILED JAN. 9, 1920.
1,374,051.
Patented Apr. 5, 1921.
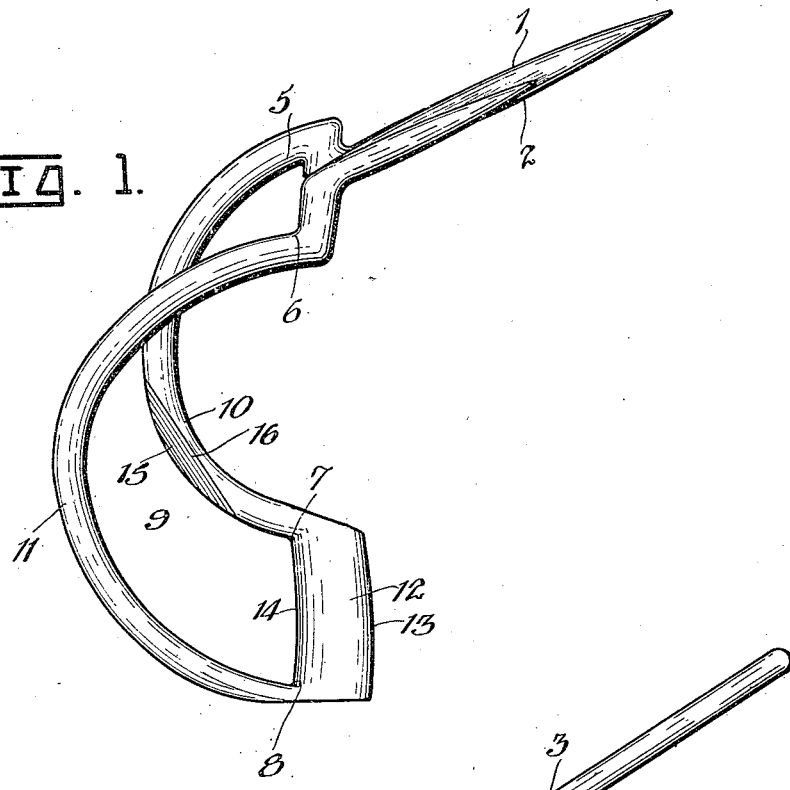
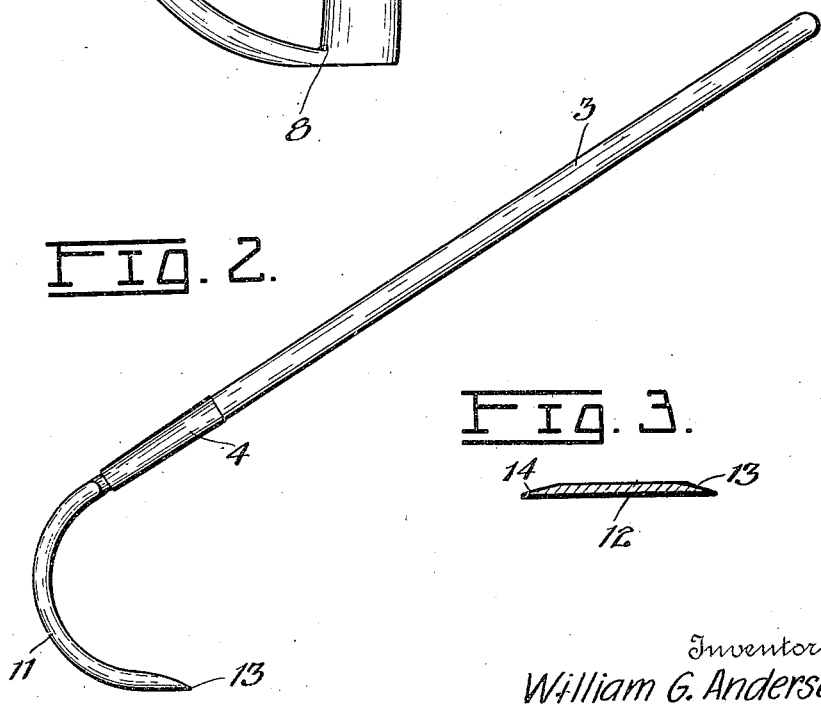
Inventor
William G. Anderson
By his Attorneys
Mason Fenwick & Lawrence

UNITED STATES PATENT OFFICE.

WILLIAM G. ANDERSON, OF SEATTLE, WASHINGTON.

GARDEN HOE AND WEEDER.

1,374,051.   Specification of Letters Patent.   Patented Apr. 5, 1921.

Application filed January 9, 1920. Serial No. 350,290.

*To all whom it may concern:*

Be it known that I, WILLIAM G. ANDERSON, a citizen of the United States, residing at 217 Orcas St., Seattle, in the county of King and State of Washington, have invented certain new and useful Improvements in Garden Hoes and Weeders; and I do hereby declare the following to be a full, clear, and exact description of the invention, such as will enable others skilled in the art to which it appertains to make and use the same.

This invention relates to garden hoes and weeders, and particularly to a form of hoe with a narrow blade sharp on both sides suitable to be moved forward and backward, and to serve with equal facility in either direction.

The objects of the invention are to provide a simple and easily constructed garden tool for weeding between rows of vegetables while they are vary small without covering them with earth, also to serve as a thinner for use in cutting across the rows to leave open spaces.

A further object is to provide a weeding tool or hoe with its cutting blade fixed at such an angle with the handle that when the handle is held in the ordinary position by the user, the blade will lie in a position substantially in the same plane with the surface of the ground. Thus as the operator moves the handle forward or back, the blade will move along under the surface at such depth as best to cut off the roots of the weeds, and still not cause any extensive upheaval of the earth to cover any adjoining plants or vegetables that it may be important to leave.

A further object is to provide a garden weeder which will kill the growing weeds, and at the same time loosen the earth near the surface to cause a form of mulsh to prevent the drying of the earth, and to provide a way for the weeds above the surface to pass over the blade of the hoe and not to clog the same while in use.

A particular object is to provide a hoe which can be used either by pulling or pushing the same while its handle is pointing in the same direction and without the user changing his position to cultivate the given spot.

With these and other objects, I have invented a simple tool preferably made from one piece of metal bent in the shape and provided with a part thereof flattened into a double edged blade, all as more fully shown in the accompanying drawings:

Figure 1 represents a perspective view of the metal part of the tool.

Fig. 2 represents a complete tool with handle, a side view.

Fig. 3 represents a cross section view of the cutting blade.

The tool is preferably and most cheaply constructed from one piece of round steel, of size as may be desired in proportion to the size of the tool to be made, and preferably of a rod about one quarter of an inch in diameter, the rod to have six right angle turns with curves, and the two ends to be brought together and sharpened as 1 and 2, to form one rounded body suitable for inserting into the end of any ordinary small wooden handle 3, reinforced by a ferrule 4.

The four angles 5, 6, 7, and 8 form a central squared opening 9 through which all weeds and clogging material freely pass while the tool is in use.

The blade 12 is preferably formed from the same piece as the side bars, and is flattened, together with the adjoining parts of the bars 10 and 11 so that the lower side of the blade is practically in one plane. The upper side of the blade is also flattened, but beveled edges 13 and 14 are provided to slope down to the lower side of the blade, and thus form sharp cutting edges, and by the raising or lowering of the handle 3, the beveled points tend to make the blade cut deeper or lower in the manner as the plowman guides his plow for a deep or shallow furrow.

In forming the side bars I prefer to bring the lower portions near the blade to a sharp ridge on their convex edges 15, either by forging the same or grinding out from the insides on an angle 16, so that as in pushing the blade backward, the earth above the blade will be pressed inward between the two bars, and so drawn away from the small plants which may be growing immediately along the path of the tool outside the bars.

The flattened thin cutting blade 12 in use may be easily moved along beneath the surface of the earth and will cut and kill all undesirable weed growth; the top surface will be loosened without covering the small plants so that even onions of one inch in height will not be injured or covered while growing close to the line of the hoe passage.

The use of this hoe is greatly facilitated by the double cutting edge of the blade, as the operator frequently desires to cut by pushing the tool instead of pulling the same, while standing in one spot. The tool is not designed for chopping as the ordinary garden hoe is used, but is designed for such work as is preferably done by moving the cutting blade along under the surface, either for killing weeds, or for cross cutting the rows of vegetables to leave desired spaces in thinning the plants left.

Claim:

A garden tool comprising two parallel curved bars having bevels on their inner faces and having their upper ends connected to a handle and their lower ends connected by a transverse flattened cutting bar, said bar having a flattened face in a plane substantially perpendicular to the end of the handle.

In testimony whereof I affix my signature.

WILLIAM G. ANDERSON.